(12) United States Patent
Metschke

(10) Patent No.: US 7,077,611 B2
(45) Date of Patent: Jul. 18, 2006

(54) O-RING FORMING SEALING WASHER

(75) Inventor: Christopher S. Metschke, Nevada, IA (US)

(73) Assignee: Fisher Controls International LLC., St. Louis, MO (US)

( * ) Notice: Subject to any disclaimer, the term of this patent is extended or adjusted under 35 U.S.C. 154(b) by 141 days.

(21) Appl. No.: 10/434,709

(22) Filed: May 9, 2003

(65) Prior Publication Data

US 2004/0222593 A1    Nov. 11, 2004

(51) Int. Cl.
*F16B 43/00*    (2006.01)

(52) U.S. Cl. ............... 411/371.1; 411/542; 277/634; 277/644; 277/924

(58) Field of Classification Search .......... 277/628, 277/644, 353, 924, 650, 634; 411/542, 369, 411/368, 371.1
See application file for complete search history.

(56) References Cited

U.S. PATENT DOCUMENTS

| | | | |
|---|---|---|---|
| 2,859,055 A | 11/1958 | Hupp | |
| 3,160,054 A | 12/1964 | Cohen et al. | |
| RE27,085 E * | 3/1971 | Weidner | 411/371.1 |
| 3,606,357 A | 9/1971 | Yonkers | |
| 3,670,618 A * | 6/1972 | Jellison | 411/371.1 |
| 3,788,185 A | 1/1974 | Gutshall | |
| 3,882,752 A | 5/1975 | Gutshall | |
| 4,026,183 A * | 5/1977 | Bart | 411/542 |
| 4,292,876 A | 10/1981 | De Graan | |
| 4,934,856 A * | 6/1990 | Pauc | 403/24 |

FOREIGN PATENT DOCUMENTS

| | | |
|---|---|---|
| DE | 23 04 471 | 8/1973 |
| DE | 26 42 349 | 4/1977 |
| GB | 1509858 | 5/1978 |

OTHER PUBLICATIONS

International Search Report in PCT/US04/05580 dated Jul. 22, 2004.
Written Opinion in PCT/US04/05580 dated Jul. 22, 2004.
* cited by examiner

*Primary Examiner*—William L. Miller
(74) *Attorney, Agent, or Firm*—Marshall, Gerstein & Borun LLP

(57) ABSTRACT

A sealing washer includes a connecting portion and an inner edge portion disposed radially inward of the connecting portion. The inner edge portion terminates in an edge disposed in an edge plane that is offset from the connecting portion. The sealing washer may be used, for example, to form a seal between a bolt and an elastomeric sheet, by forming a tight seal as the bolt is tightened.

3 Claims, 5 Drawing Sheets

O-RING FORMING SEALING WASHER

FIELD OF THE DISCLOSURE

This disclosure relates generally to methods and apparatuses for providing seals in fluid handling equipment and, more particularly, to improvements in forming seals, such as, for example, O-ring type seals for fluid handling equipment.

BACKGROUND OF THE INVENTION

Typically, spring-and-diaphragm actuators used for fluid control valves include a bolted joint attaching a diaphragm to an actuator stem, wherein the bolted joint protrudes through the diaphragm. This joint requires a seal between the bolt and actuator stem on the one hand and the diaphragm on the other hand. To provide such a seal, an applied sealant and/or a separate O-ring is typically installed, which tends to increase assembly and component costs. In addition, care must be taken to avoid over tightening of the bolt to avoid damaging the diaphragm when the bolt is tightened to attach the diaphragm to the actuator stem.

SUMMARY OF THE INVENTION

A sealing washer includes a connecting portion and an inner edge portion disposed radially inward of the connecting portion. The inner edge portion terminates in an edge disposed in an edge plane that is offset from the connecting portion.

DETAILED DESCRIPTION OF THE PREFERRED EMBODIMENTS

Figure 1:
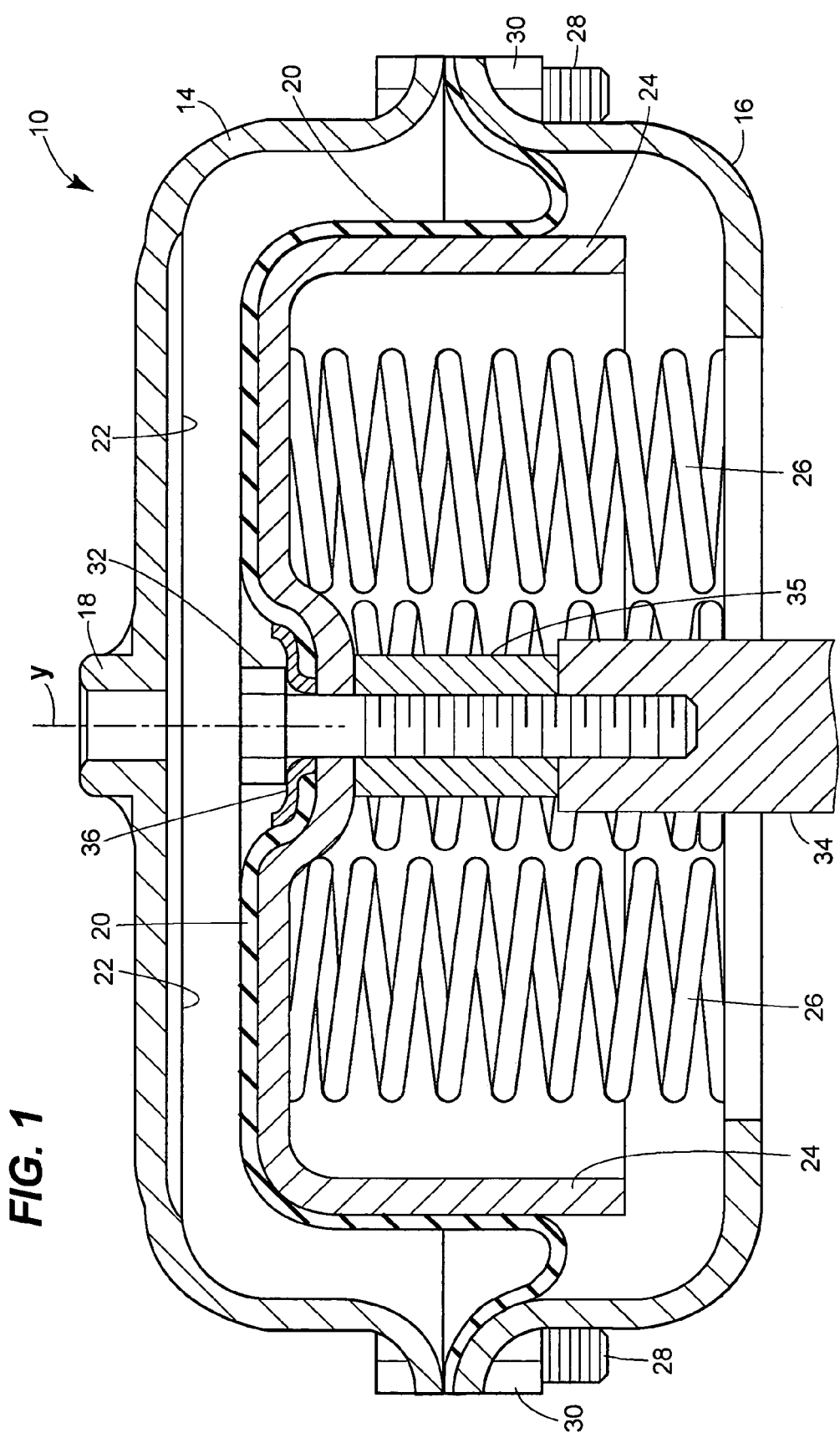
FIG. 1 is a cross-sectional view of a control valve pressure actuator.

With referenced initially to FIG. 1, a control valve pressure actuator 10 is shown having an upper diaphragm casing 14 and a lower diaphragm casing 16. A vent or air port 18 is provided in the upper diaphragm casing 14, to facilitate connection of pressure tubing (not shown). The control valve pressure actuator 10 is of the pressure-to-close type, meaning that a membranal member, such as a diaphragm 20 within the upper diaphragm casing 14, will have a "fail open" arrangement. That is, the diaphragm 20 will be disposed adjacent to an inside surface 22 of the upper diaphragm casing 14, in the event of a loss of air pressure used to control the position of the diaphragm 20. The diaphragm may be made out of an elastomer material, such as, for example, nitrile rubber, fluoroelastomer material, silicone elastomer material, EPDM rubber, or any other suitable material The diaphragm 20 may be mounted on a diaphragm plate 24 (that may be made out of steel). The diaphragm plate 24 may be mounted on one or more springs 26, which may serve to bias the diaphragm 20 toward the open position. A plurality of bolts 28 and nuts 30 may be employed at periodic positions about the upper diaphragm casing 14 and lower diaphragm casing 16 with the diaphragm 20 secured therebetween at a peripheral portion thereof.

Figure 2:
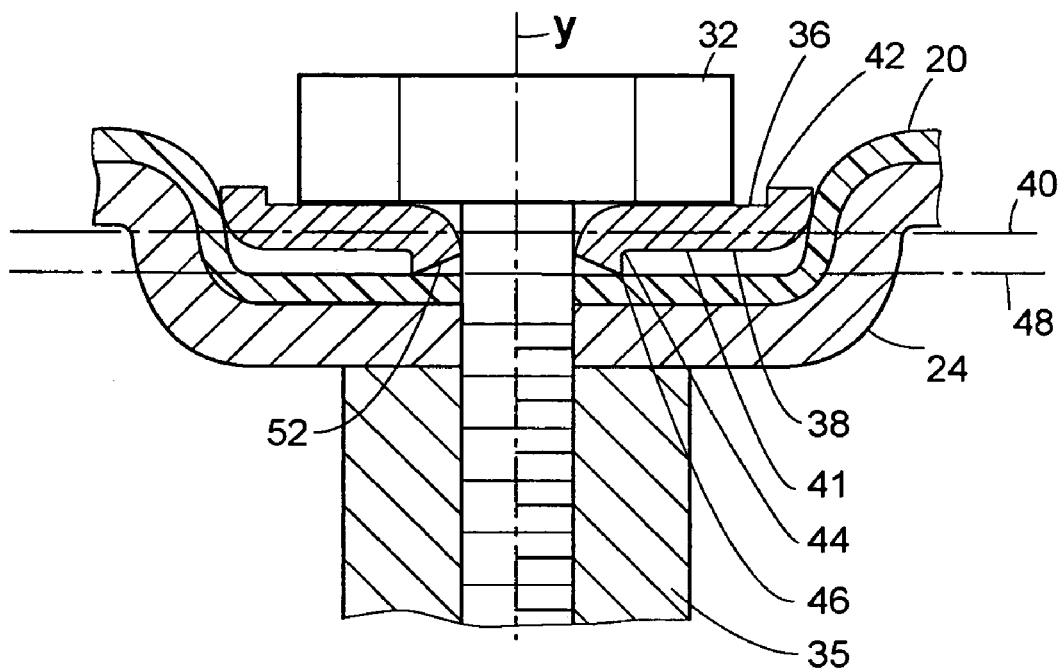
FIG. 2 is an enlarged cross-sectional view depicting an upper portion of a valve stem, a diaphragm plate, a diaphragm, a sealing washer, and a bolt, showing a configuration prior to tightening of the bolt.
Figure 3:
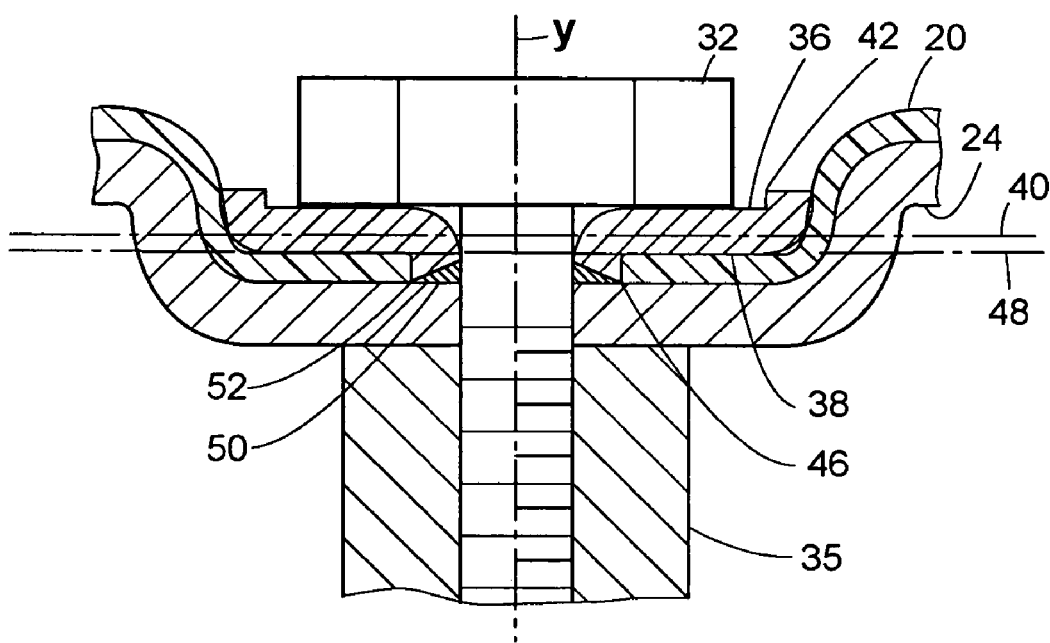
FIG. 3 is a view, similar to that of FIG. 2, after tightening of the bolt.
Figure 4:
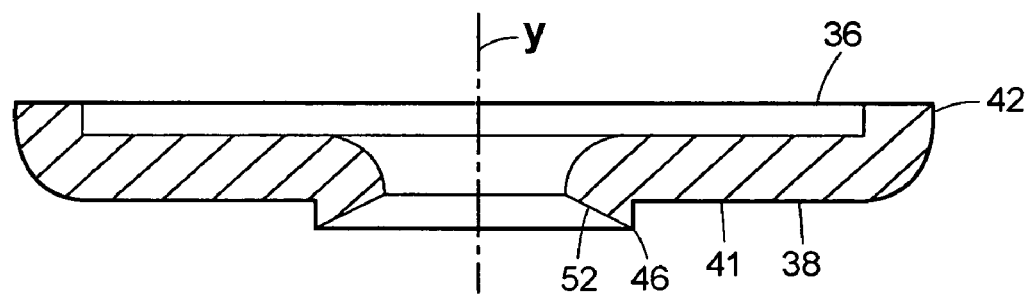
FIG. 4 is a cross-sectional view of the sealing washer of FIGS. 1–3.

A bolt 32 may be used to secure the diaphragm 20 and the diaphragm plate 24 to an actuator stem 34, and a spacer sleeve 35 may be disposed between the diaphragm plate 24 and the actuator stem 34. A sealing washer 36 may be disposed between the bolt 32 and the diaphragm 20. As best seen in FIGS. 2–4, the sealing washer 36 may be substantially axisymmetric about a central axis y, aligned with the bolt 32, and may include a connecting portion 38 centered about a primary plane 40 and having a lower surface 41, and also may include an outer edge portion 42 disposed radially outward of the connecting portion 38 and/or an inner edge portion 44 disposed radially inward of the connecting portion 38. The inner edge portion 44 may terminate in a cutting edge 46 disposed in an edge plane 48 that is offset from the primary plane 40. The connecting portion 38 may have a substantially planar geometry, and may be oriented substantially normal to the y axis Due to the configuration of the sealing washer 36, as the bolt 32 is tightened, the cutting edge 46 moves down and cuts through the diaphragm 20, thereby forming a sealing O-ring 50, as seen in FIG. 3. Due to a beveled surface 52 (see FIG. 4) on the inner edge portion 44, the sealing O-ring 50 is compressed inwardly and downwardly as oriented in FIG. 3, to provide a tight seal between the bolt 32 and the diaphragm plate 24. In addition, since the cutting edge 46 extends below the lower surface 41 of the connecting portion 38 of the sealing washer 36, the connecting portion 38 is prevented from overly compressing the diaphragm 20 due to the metal-to-metal contact between the cutting edge 46 and the diaphragm plate 24 when the bolt 32 is fully tightened, as depicted in FIG. 3.

Figure 5:
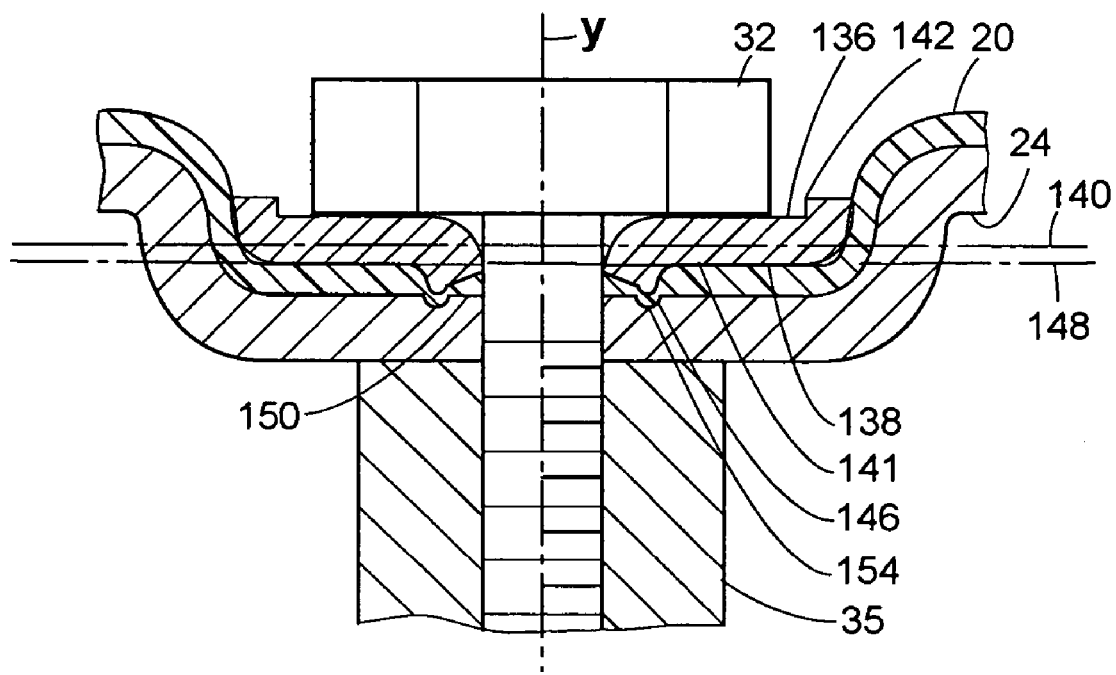
FIG. 5 is a view, similar to that of FIG. 3, of an alternative embodiment of the disclosure.

Alternatively, according to an alternative embodiment of the disclosure, as depicted in FIG. 5, a sealing washer 136 may include a connecting portion 138 centered about a primary plane 140 and having a lower surface 141. The sealing washer 136 may also include an outer edge portion 142 disposed radially outward of the connecting portion 138 and/or an inner edge portion 144 disposed radially inward of the connecting portion 138. The inner edge portion 144 may terminate in a rounded edge 146 disposed in an edge plane 148 that is offset from the primary plane 140. The diaphragm plate 124 may include a circular groove 154 that is engaged by a portion of the diaphragm 20 and the rounded edge 146 as the bolt 32 is tightened. According to this configuration depicted in FIG. 5, a circumferential seal 150 may thus be formed by compressing a portion of the diaphragm 20, without the necessity of actually cutting the diaphragm 20.

A shoulder bolt (not shown) may be used in place of the bolt 32, in order to limit compression of the diaphragm 20 (e.g., to prevent diaphragm damage). In addition, the sealing washer 136 may include an anti-rotation capability, such as, for example, a keyway (not shown) that may be used to prevent diaphragm damage due to shear loads that might be applied to the diaphragm 20 between the sealing washer 136 and the diaphragm plate 124 if the sealing washer 136 rotates as the bolt 32 is tightened.

FIGS. 6 through 9 depict various further alternative embodiments of the sealing washer, 236, 336, 436, and 536 respectively.

Figure 6:
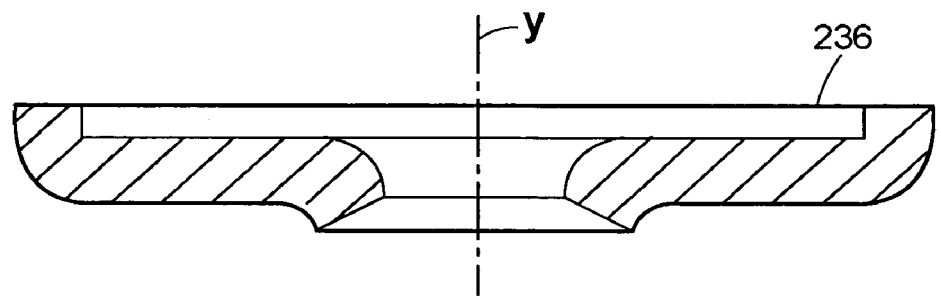
FIGS. 6 through 9 are cross-sectional views of sealing washers according to further alternative embodiments of the disclosure.

As shown in FIG. 6, the geometry of the sealing washer 236 may include a curvilinear shape in the vicinity of an inner edge portion 244.

Figure 7:
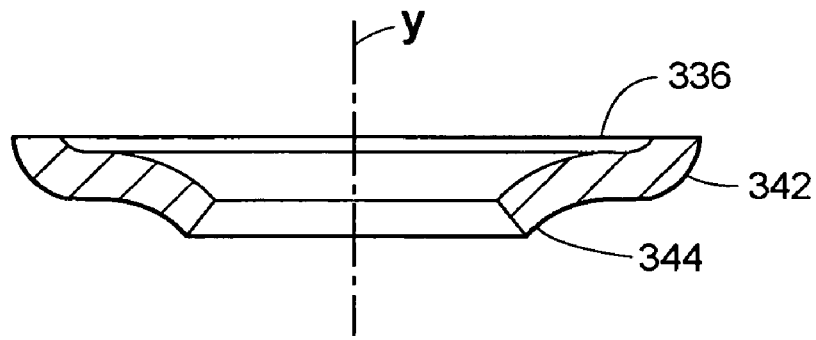

As shown in FIG. 7, the geometry of the sealing washer 636 may include a curvilinear shape in the vicinity of an inner edge portion 344 and an outer edge portion 342.

Figure 8:
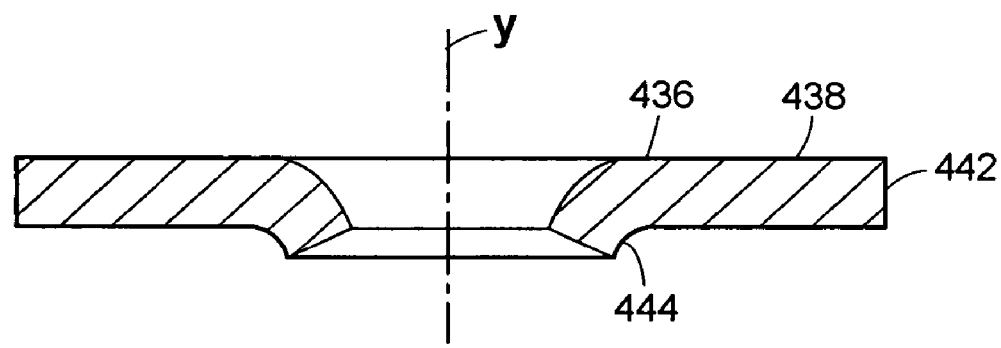

As shown in FIG. 8, the sealing washer 436 may include a connecting portion 438 and a downwardly extending inner edge portion 444, while omitting any out-of-plane geometry in the vicinity of an outer edge portion 442.

Figure 9:
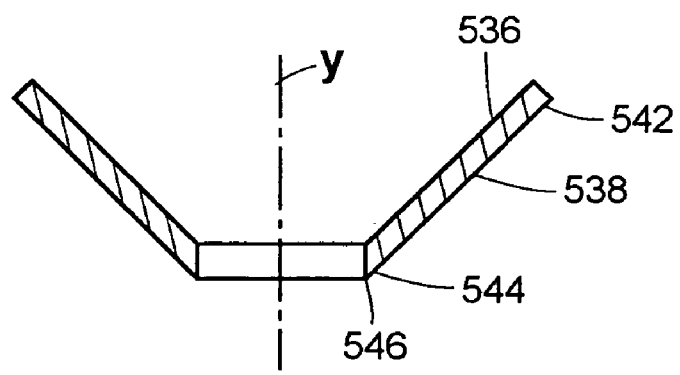

FIG. 9 depicts yet another alternative embodiment in which the sealing washer 536, that is generally configured as a Bellville washer, and includes an outer edge portion 542, an inner edge portion 544, and a connecting portion 538. The connecting portion may be generally oriented at an acute angle with respect to the y axis. The inner edge portion 544 may terminate in a cutting edge 546.

It should be noted that the sealing washer may be formed by stamping, casting, forging, molding, or any other suitable process. Furthermore, the sealing washer may be constructed from steel, or any suitably hard material, such as, for example, a sufficiently strong and hard polymer material. The sealing washer according to the invention may be used in a wide variety of applications in addition to that shown and described herein, including, but not limited to, diaphragm pumps, vacuum actuators and automotive bushings.

What is claimed is:

1. A sealing assembly for imparting a seal within an elastomeric membranal member, said sealing assembly comprising:
a sealing washer comprising a generally planar main body portion having an aperture centrally disposed therein; and
a portion extending generally normal to the main body portion about the aperture and terminating at an exposed surface, the exposed surface defining a cutting edge, disposed radially outwardly of the aperture; an elongated fastener received in the centrally disposed aperture; the elastomeric membranal member having a fastener-receiving aperture therein; at least one relatively hard surface to which the elastomeric membranal member is secured; the elongated fastener received through the fastener-receiving aperture, with the sealing washer disposed between the elongated fastener and the fastener-receiving aperture, the elongated fastener adapted to be urged toward the relatively hard surface; a portion of the elastomeric membranal member surrounding the fastener-receiving aperture cut completely through by the cutting edge of the exposed surface of the sealing washer, said cut portion of the elastomeric membranal member defining a sealing ring about the elongated fastener within the aperture; and wherein the exposed surface is a beveled surface.

2. The sealing assembly of claim 1, wherein the elastomeric membranal member is a diaphragm, the relatively hard surface is a diaphragm plate, and the elongated fastener is a bolt.

3. The sealing assembly of claim 2, wherein the bolt is urged toward the diaphragm plate such that the cutting edge of the sealing washer contacts the diaphragm plate, thereby impeding further movement of the bolt toward the diaphragm plate.

* * * * *